H. E. FAITH.
NUT LOCK.
APPLICATION FILED OCT. 26, 1912.
1,070,125.
Patented Aug. 12, 1913.
FIG.1.
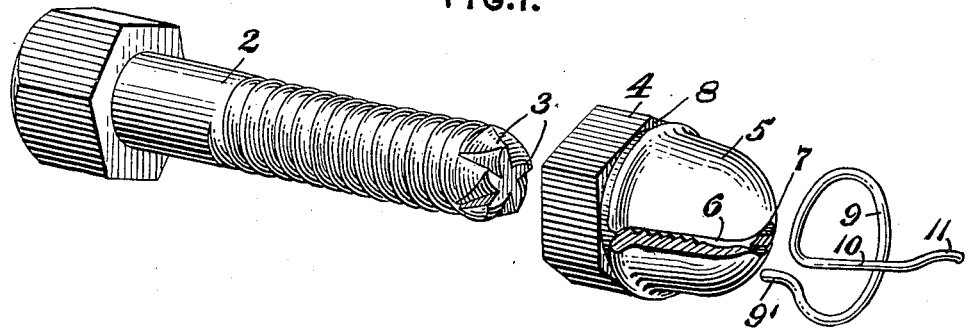
FIG.2.     FIG.3.     FIG.4.
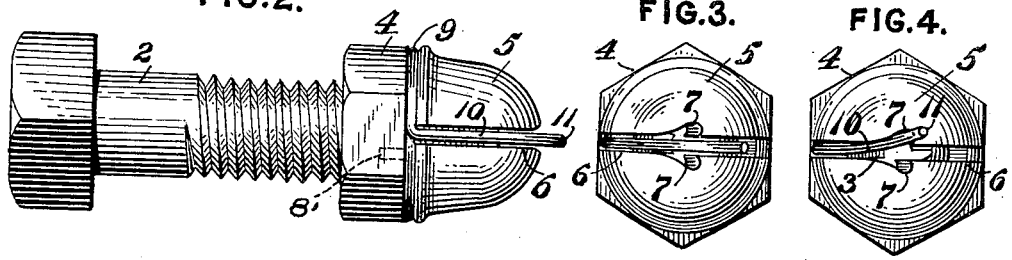 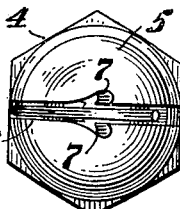 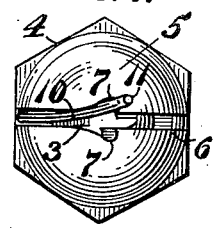
FIG.5.
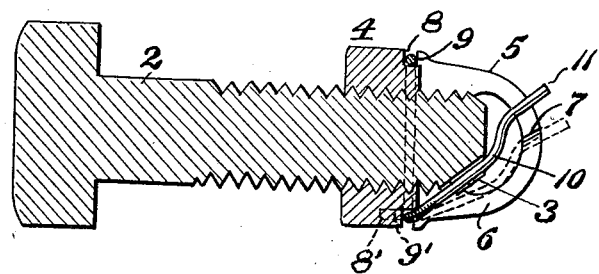
WITNESSES
INVENTOR
H. E. Faith

UNITED STATES PATENT OFFICE.

HARRY E. FAITH, OF BRAVE, PENNSYLVANIA.

NUT-LOCK.

1,070,125.  Specification of Letters Patent.  Patented Aug. 12, 1913.

Application filed October 26, 1912. Serial No. 727,904.

*To all whom it may concern:*

Be it known that I, HARRY E. FAITH, a resident of Brave, in the county of Greene and State of Pennsylvania, have invented certain new and useful Improvements in Nut-Locks, of which the following is a specification.

The object of this invention is to provide an efficient lock which is designed especially for cap nuts, *i. e.*, a nut which embraces the extremity of the bolt. The nut carries a spring dog which normally is adapted to engage one of a series of ratchet notches formed in the end of the bolt, the dog operating within the slotted cap portion of the nut, and a further purpose of the invention is to provide for holding the dog retracted or out of bolt engaging position.

In the accompanying drawings, Figure 1 is a view of the bolt, nut, and spring dog, the parts being separated from each other. Fig. 2 is an elevation of the bolt and nut with the lock in position thereon. Fig. 3 is an end elevation with the dog shown in locking position, and Fig. 4 is a similar elevation with the dog held retracted or out of engagement with the bolt notches. Fig. 5 is a longitudinal section, illustrating the action of the spring dog.

Referring to the drawings, bolt 2 is threaded as usual and has its extremity formed with a circular series of ratchet-like projections 3, each projection being curved on one side and with its opposite face abrupt, as shown, so that a spring dog may readily move thereover in one direction but is locked against movement in the opposite direction.

4 is a cap nut of ordinary form, 5 being the cap portion thereof.

Cap 5 is slotted at 6 in direction longitudinally of the bolt, with offsets 7 in the slot which are preferably located at the outer end of the cap. The exterior of the nut is grooved circumferentially at 8 to receive coil or wrapping 9 with a piece of spring wire, short extremity 9' of the wire being entered in the socket 8' leading from groove 8. The free portion 10 of the wire constitutes a spring dog which extends into slot 6 with the bent extremity 11 thereof projecting outwardly from the cap, as shown in Figs. 2 and 5.

Normally, the spring dog extends into slot 6 sufficiently far to engage the notched end of the bolt, being deflected by the ratchet projections 3 as the nut is turned up, the successive projections being engaged by the wire and preventing the nut from being turned in a backward direction, as will be understood. When in bolt-engaging position the spring dog normally extends past offsets 7 so that the spring dog can not be deflected by strain thereon, and the efficiency of the lock is in no way impaired by the notches. To release the lock extremity 11 the spring dog is simply pressed backward sufficient to permit it to be deflected laterally into one or the other of notches 7, thereby holding the dog out of position for engaging the ratchet teeth of the bolt, leaving the nut free for such manipulation as may be desired. When the nut is to be locked the spring dog is simply sprung from offset 7 and the nut is turned home and automatically and securely held.

I claim:—

1. The combination of a bolt formed with a notched extremity, a cap nut having its cap portion slotted, and a spring dog secured to the nut and extending into the slot thereof for engaging a bolt notch.

2. The combination of a bolt formed with a notched extremity, a cap nut having its cap portion slotted, and a spring dog secured to the cap and located within the slot in notch engaging position with the dog free at one end and adapted to be deflected out of such position, the dog adapted between its ends to engage a bolt notch.

3. The combination of a threaded bolt having its extremity formed with ratchet notches, a nut formed with a bolt embracing cap with the cap slotted to expose the inclosed ratchet-formed extremity of the bolt, a spring dog within the slot and normally in position to engage one or another of the ratchet notches, and means for holding the spring dog out of notch-engaging position.

4. The combination of a bolt having ratchet notches in the end thereof, a cap nut adapted to embrace the notched end of the bolt, the cap portion of the nut being slotted longitudinally of the bolt, and a spring dog secured to the nut and extending into the slot and adapted to engage the bolt notches.

5. The combination of a bolt having ratchet notches in the end thereof, a cap nut adapted to embrace the notched end of the bolt, the cap portion of the nut being slotted and the slot formed with an offset, and a spring dog secured to the nut and having a free portion within the slot and adapted normally to engage the ratchet notches, the free portion adapted to be deflected into the slot offset and held thereby from engaging the notches.

6. The combination of a bolt having ratchet notches in the end thereof, a cap nut adapted to embrace the end of the bolt, the cap portion of the nut being slotted longitudinally of the bolt, the nut formed with an exterior groove, and a piece of spring wire secured in the groove with a free portion thereof lying within the cap slot and forming a dog for engaging the bolt notches.

7. The combination of a bolt having ratchet notches in the end thereof, a cap nut adapted to embrace the end of the bolt, the cap portion of the nut being slotted longitudinally of the bolt with the slot formed with an offset, the nut formed with a circumferential groove, and a piece of spring wire confined in the groove with the free portion of the wire extending into the cap slot and forming a dog for normally engaging the bolt notches, said free portion being adapted to be deflected into the slot offset for holding the dog normally out of engagement with the notches.

8. The combination of a bolt having ratchet notches in the end thereof, a cap nut having the cap portion thereof slotted with a lateral offset in the slot, and a spring dog secured to the nut and extending into the slot and past the offset thereof for normally engaging the bolt notches, the dog being adapted to be deflected outwardly and laterally into the offset and held thereby from engaging the bolt notches.

In testimony whereof I affix my signature in presence of two witnesses.

HARRY E. FAITH.

Witnesses:
E. O. MAIN,
C. H. MAPEL.

---

Copies of this patent may be obtained for five cents each, by addressing the "Commissioner of Patents, Washington, D. C."